United States Patent
Uhlhorn, Jr.

[15] 3,662,887
[45] May 16, 1972

[54] OIL PUMP INLET STRAINER

[72] Inventor: Walker S. Uhlhorn, Jr., Germantown, Tenn.

[73] Assignee: Ripley Screen and Strainer Company, Collierville, Tenn.

[22] Filed: Jan. 21, 1970

[21] Appl. No.: 4,586

[52] U.S. Cl..............................................210/131, 210/416
[51] Int. Cl...........................................................B01d 29/04
[58] Field of Search.........................................210/131, 416

[56] References Cited

UNITED STATES PATENTS

| | | | |
|---|---|---|---|
| 2,508,952 | 5/1950 | Kline | 210/131 |
| 2,192,438 | 3/1940 | Gulick | 210/131 |
| 2,663,425 | 12/1953 | Haselwood | 210/131 |

Primary Examiner—John Adee
Attorney—Mason, Fenwick & Lawrence

[57] ABSTRACT

A sump immersed pump inlet strainer in which a metal casing connected to a pump inlet has a circular inflow opening with a straining screen extending across the opening and peripherally retained in the opening with the screen having a central crimped protrusion extending outwardly and holding a metal plate in place in blocking relationship with respect to an aperture in the screen so that movement of the screen from an outwardly bowed position with respect to the inflow opening to an inwardly bowed position due to clogging of the screen and pump suction on the interior of the casing will release the plate to permit oil flow inwardly through the then unblocked aperture.

10 Claims, 4 Drawing Figures

PATENTED MAY 16 1972 3,662,887
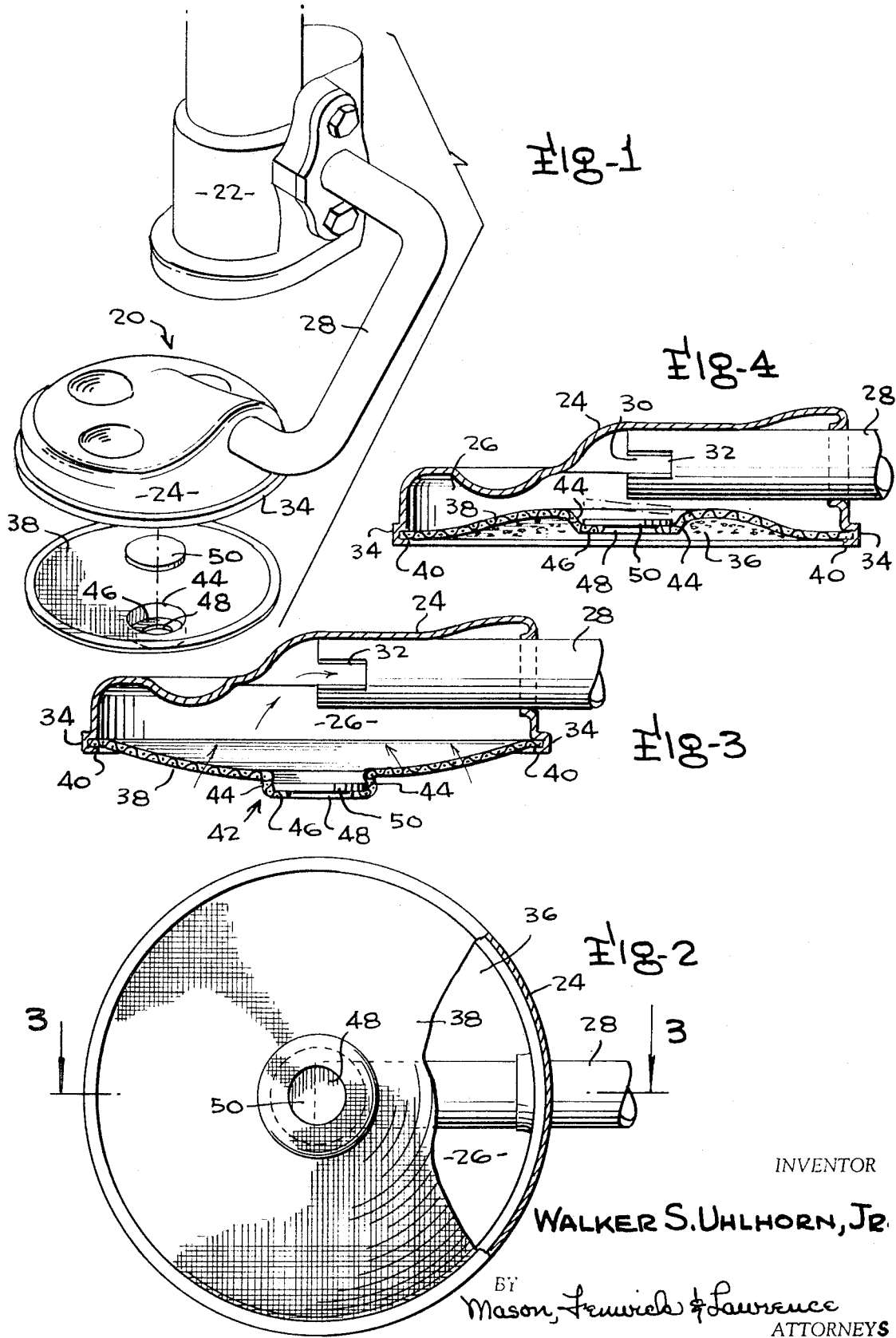
INVENTOR
WALKER S. UHLHORN, JR.
BY Mason, Fenwick & Lawrence
ATTORNEYS 3,662,887

OIL PUMP INLET STRAINER

BACKGROUND OF THE INVENTION

This invention is in the field of strainers and is specifically directed to an automotive type strainer of the type mounted in the oil pan or sump of an automobile or other internal combustion engine and connected to the oil pump inlet for straining oil flowing to the pump.

Numerous prior art screen type devices have evolved for the purpose of straining the oil in internal combustion engines to prevent sludge and the like from entering the oil pump.

Numerous prior art screen type devices have evolved for the purpose of straining the oil in internal combustion engines to prevent sludge and the like from entering the oil pump. However, since such devices are immersed in the oil in the sump and are rarely, if ever, removed, their screens eventually become clogged. While it is desirable that the oil flowing to the pump remain in a clean condition, it is more important, and is actually imperative, that flow to the pump should not be interrupted since a lack of lubrication would quickly destroy the engine. A number of the prior art devices have recognized the consequent need for permitting flow to the pump to be continued following blockage of the straining screen by sediment, sludge, bits of trash or the like in the oil. Therefore, a number of the prior known devices have been capable of permitting continued flow of oil following blockage of the screen by sediment. For example, one well known device employs a circular screen which is crimped within a metal casing so that the screen is bowed outwardly and a grommet fixed to the center of the screen engages a metal plate so that the aperture in the grommet is blocked. Consequently, the oil flows through the screen into the casing and then to the oil pump. However, upon the screen becoming blocked by sludge and the like, the screen is deflected inwardly so that the grommet moves away from the metal plate and the aperture in the grommet is then open to permit the oil to flow directly into the casing through the grommet aperture. While devices of this type have functioned fairly satisfactorily, it has long been desired to simplify the construction in order to lessen the cost of such devices. The instant invention provides a highly simplified construction which completely eliminates the need for a grommet and the metal plate against which the grommet is urged. The resultant construction is much more simple than the prior known devices and is consequently easier and cheaper to manufacture.

SUMMARY OF THE INVENTION

It is the primary object of this invention to provide a new and improved oil pump inlet strainer.

Obtainment of the object of this invention is enabled through the provision of a metal casing defining an inlet chamber having a circular inflow opening in which a straining screen is mounted. The straining screen extends across the aperture and is crimped in position in the aperture with the screen being normally bowed outwardly with respect to the casing. The center portion of the screen is provided with a crimped protrusion extending outwardly from the main portion of the screen and terminating in a radially inwardly extending rim which terminates in a circular aperture in the middle of the screen. Consequently, the crimped protrusion is in the general shape of the bottom portion of a cone in which the top portion is removed with the connecting portion between the crimped portion and the main body of the screen constituting the top of the conical portion. A metal disc is mounted in the outermost portion of the crimped protrusion and is retained in position by the peripheral flange and the wall of the protrusion so that the aperture in the end of the protrusion is completely blocked. However, continued use of the subject device eventually results in the screen becoming clogged with sediment and the like so that the pump suction on the interior of the casing pulls the screen inwardly from its outwardly bowed position to an inwardly bowed position. Upon movement of the screen to the inwardly bowed position, the protrusion opens up to free and release the disc so that oil can then flow through the then unblocked aperture. While the unblocking of the aperture serves to completely terminate the straining function, it prevents oil starvation of the oil pump and consequent serious damage to the engine. The device is extremely simple and represents a much simplified construction over the prior known devices. Consequently, the subject invention enables a great savings in cost over the previously known devices for the same general purpose.

DESCRIPTION OF THE DRAWINGS

FIG. 1 is an exploded perspective view illustrating the component parts of the preferred embodiment of the invention as connected to an oil pump;

FIG. 2 is a bottom plan view of the preferred embodiment;

FIG. 3 is a sectional view taken along lines 3—3 of FIG. 2 illustrating the position of the parts in the normal condition before the screen becomes clogged; and FIG. 4 is a sectional view similar to FIG. 3 but illustrating the movement of the screen to its inwardly bowed position following clogging of the screen.

DESCRIPTION OF THE PREFERRED EMBODIMENT

Attention is initially invited to FIG. 1 of the drawings which illustrates the preferred embodiment of this invention which is generally designated 20 and which is shown in connection with a conventional oil pump 22.

It should be understood that the entire device is immersed in oil in an oil pan or sump of an internal combustion engine; however, the sump or oil pan are not shown since such would merely serve to obscure and confuse the nature of the preferred embodiment.

In any event, the preferred embodiment is formed of a main support element in the form of a metal casing 24 which defines a hollow inflow chamber 26 (FIG. 3) and which is connected to the oil pump 22 by means of a metal conduit 28. Metal conduit 28 extends into the interior of the casing 24 and the inflow chamber 26 and is provided with an inlet opening 30 which includes a notched portion 32 the purpose of which will be discussed hereinafter. The other end of conduit 28 is connected to the inlet of the conventional oil pump 22 in a conventional manner.

Casing 24 is provided with a peripheral circular flange 34 the inside periphery of which defines a circular inflow opening 36 through which oil moves inwardly into the chamber 26 for eventual movement into the pump 22 via conduit 28.

A straining screen 38 of circular configuration is mounted in the peripheral circular flange 34 by means of an overlying crimped edge 40 of the peripheral circular flange 34 as best shown in FIGS. 3 and 4.

The central portion of screen 38 is provided with a crimped protrusion generally designated 42 which is formed with a side wall 44 and which has an outward termination in the form of a radially inwardly extending rim flange 46. The inner circumferential periphery of the rim flange 46 defines an aperture 48 in the screen. A blocking member in the form of a disc-like metal plate 50 of circular configuration is normally positioned against the rim flange 46 in blocking relationship with respect to the aperture 48 as shown in FIG. 3. Side wall 44 is in the general shape of the base of a cone of which the top portion has been removed. In this case, the line of removal would be adjacent the point at which protrusion 42 extends outwardly from the main body portion of the screen 38. In any event, the side wall 44 overlies the circular metal disc 50 so that the disc 50 is retained in position by side wall 44 and the rim flange 46 in a manner made obvious from inspection of FIG. 3. The disc 50 cannot move inwardly into chamber 26 since the side wall 44 progresses radially inwardly from the peripheral flange 46 to the juncture of the protrusion 42 and the remainder of the screen as shown in FIG. 3.

The parts will remain in the position shown in FIG. 3 while the screen is in a clean condition so that oil can flow inwardly through the screen in a manner indicated by the arrows to enter the conduit 28 for subsequent entry into the inlet of pump 22. However, screen 38 will eventually become clogged with sediment and other foreign matter so that the flow of oil through the screen is impeded and eventually the screen becomes substantially blocked. Such blockage of screen 38 prevents the flow of oil into chamber 26 and the suction of pump 22 then pulls the screen inwardly from its outwardly bowed position of FIG. 3 to the inwardly bowed position of FIG. 4. Consequently, plate 50 is released to move inwardly into chamber 26 in the manner shown in the dashed-line illustration of the plate in FIG. 4 and aperture 50 is consequently unblocked. Oil is then free to flow inwardly through aperture 50 into chamber 26 in the manner indicated by the arrows in FIG. 4 so that pump 22 will receive oil flowing inwardly through aperture 48, inlet 30 and conduit 28 to the pump inlet. It is impossible for the dislodged plate 50 to block the inlet 30 of conduit 28 since notch 32 in the end of the conduit will prevent any such blockage from occurring in an obvious manner.

Therefore, it will be seen that the preferred embodiment provides a vastly simplified and trouble-free construction over what has been known heretofore. Moreover, it should be understood that the invention is not limited to the preferred embodiment and modifications will occur to those skilled in the art which will not depart from the spirit and scope of this invention which is limited solely by the following claims.

I claim:

1. A sump immersed oil pump inlet strainer comprising a rigid intake casing defining a hollow inflor chamber, means connecting said hollow chamber to an oil pump inlet, straining screen means peripherally restrained in and extending across an inflow opening in said casing, said straining screen being positioned in a first position in which it is normally bowed outwardly with respect to said inflow opening but being capable of being bowed inwardly in a second position with respect to said inflow opening, an aperture in said screen, said screen including a supporting portion supporting and retaining an aperture blocking member in said aperture on the side of said screen opposite said inflow opening when said screen is bowed outwardly in its first position and for releasing said aperture blocking member from said screen for inward movement into said casing away from the screen in response to movement of said screen to its inwardly bowed position whereby upon clogging of said screen, suction on the interior of said chamber will move the screen inwardly so that said aperture blocking member will be released and oil can then flow into the chamber via the aperture in said screen.

2. The invention of claim 1 wherein said aperture blocking member comprises a disc-like plate.

3. The invention of claim 2 wherein said supporting portion supporting and retaining said aperture blocking member in said aperture comprises a centrally oriented crimped protrusion of said screen extending outwardly from the screen and the inflow opening to define a generally conical surface symmetrical with respect to the axis of said aperture in said screen, a radially inwardly extending rim flange defining the outermost extent of said protrusion portion whereby said disc-like plate is retained between the conical surface and the rim flange when the screen is in its outwardly bowed position by virtue of the fact that the apex of the conical surface is inwardly of the screen but the plate is released upon movement of the screen to its inwardly bowed position by virtue of reorientation of the conical surface to a shape in which a second conical surface with an apex outwardly of the screen is formed and the disc-like plate is consequently free to move inwardly within the chamber.

4. The invention of claim 2 wherein said supporting portion supporting and retaining said aperture blocking member in said aperture comprises a centrally oriented crimped protrusion of said screen extending outwardly from the screen and the inflow opening and having a side wall encircling and engaging the periphery of the aperture blocking member and terminating in a radially inwardly extending rim flange with the inner periphery of said rim flange defining said aperture with said aperture blocking member being adjacent and engageable with the rim flange and with the said side wall overlying the aperture blocking member to retain the aperture blocking member in position adjacent the flange when the screen is in its outwardly bowed position whereby movement of the screen to its inwardly bowed position opens up the side wall of the protrusion so that it no longer overlies said aperture blocking member and the aperture blocking member is consequently free to move inwardly into the casing to permit oil to flow through said aperture in said screen.

5. The invention of claim 4 wherein said inflow opening and said screen are circular in shape.

6. The invention of claim 2 wherein said inflow opening and said screen are circular in shape.

7. The invention of claim 6 wherein said supporting portion supporting and retaining said aperture blocking member in said aperture comprises a centrally oriented crimped protrusion of said screen extending outwardly from the screen and the inflow opening and having a side wall encircling and engaging the periphery of the aperture blocking member and terminating in a radially extending rim flange with the inner periphery of said rim flange defining said aperture with said aperture blocking member being adjacent and engageable with the rim flange and with the said side wall overlying the aperture blocking member to retain the aperture blocking member in position adjacent the flange when the screen is in its outwardly bowed position whereby movement of the screen to its inwardly bowed position opens up the side wall of the protrusion so that it no longer overlies said aperture blocking member and the aperture blocking member is consequently free to move inwardly into the casing to permit oil to flow through said aperture in said screen.

8. The invention of claim 7 wherein said disc-like plate is circular and said aperture in said screen is circular.

9. The invention of claim 2 wherein said means connecting said hollow chamber to said oil pump inlet comprises a hollow conduit extending inwardly into said casing and having a notched opening on its end within said casing so that said disc-like plate cannot block said opening upon movement of said disc-like plate inwardly into said casing.

10. The invention of claim 9 wherein said supporting portion supporting and retaining said aperture blocking member in said aperture comprises a centrally oriented crimped protrusion of said screen extending outwardly from the screen and the inflow opening and having a side wall encircling and engaging the periphery of the aperture blocking member and terminating in a radially inwardly extending rim flange with the inner periphery of said rim flange defining said aperture with said aperture blocking member being adjacent and engageable with the rim flange and with the said side wall overlying the aperture blocking member to retain the aperture blocking member in position adjacent the flange when the screen is in its outwardly bowed position whereby movement of the screen to its inwardly bowed position opens up the side wall of the protrusion so that it no longer overlies said aperture blocking member and the aperture blocking member is consequently free to move inwardly into the casing to permit oil to flow through said aperture in said screen.

* * * * *